United States Patent [19]

Grawey

[11] 3,954,538
[45] May 4, 1976

[54] METHOD OF FORMING A TIRE CARCASS
[75] Inventor: Charles E. Grawey, Peoria, Ill.
[73] Assignee: Caterpillar Tractor Co., Peoria, Ill.
[22] Filed: June 12, 1974
[21] Appl. No.: 478,541

[52] U.S. Cl.................... 156/117; 156/397; 156/408; 264/317; 425/178; 425/DIG. 119; 425/DIG. 125
[51] Int. Cl.² .......................................... B29H 17/02
[58] Field of Search ............ 156/117, 123, 155, 397, 156/404, 405, 408, 409, 410, 421, 414, 394 FM; 264/317; 425/176, 42, 50, 405, DIG. 125, DIG. 119

[56] References Cited
UNITED STATES PATENTS

| 1,184,328 | 5/1916 | Dees | 156/117 |
|---|---|---|---|
| 1,295,594 | 2/1919 | Price | 156/394 FM |
| 2,744,043 | 5/1956 | Ramberg | 156/155 |
| 3,458,146 | 7/1969 | Warner | 156/117 X |
| 3,776,792 | 12/1973 | Grawey | 156/123 |

FOREIGN PATENTS OR APPLICATIONS

| 381,658 | 10/1932 | United Kingdom | 156/414 |

Primary Examiner—William A. Powell
Assistant Examiner—John E. Kittle
Attorney, Agent, or Firm—Phillips, Moore, Weissenberger Lempio & Strabala

[57] ABSTRACT

Disclosed herein is a method of forming a tire carcass on a porous sand core in the shape of the toroidal member, such method comprising the steps of helically wrapping rubber material about the body of the toroidal member, applying a vacuum through the porous toroidal member to the inner surface of the helically wrapped rubber material, applying force to the outer surface of the rubber material, helically winding wire about the body of the toroidal member over the outer surface of the already-wrapped rubber material, and helically wrapping additional rubber material about and over the wire and first-mentioned rubber material. A vacuum probe is introduced into the area of the helically wound wire, and force is applied to the additional, outer rubber material to urge it against the wire and against the first-mentioned rubber material.

7 Claims, 10 Drawing Figures

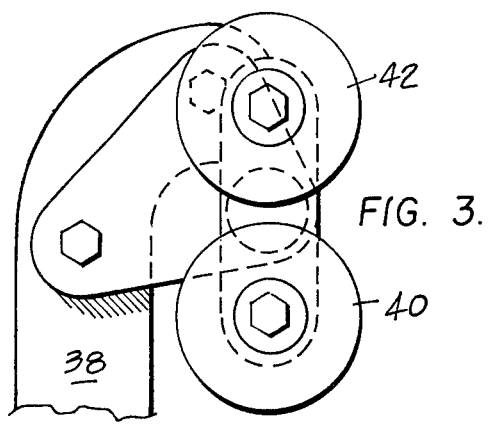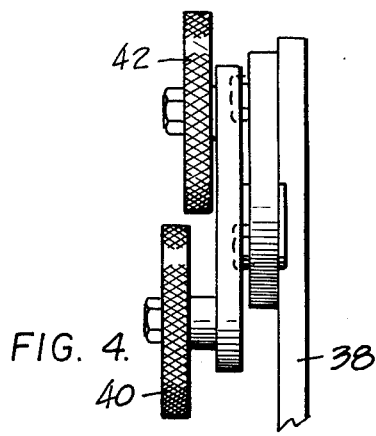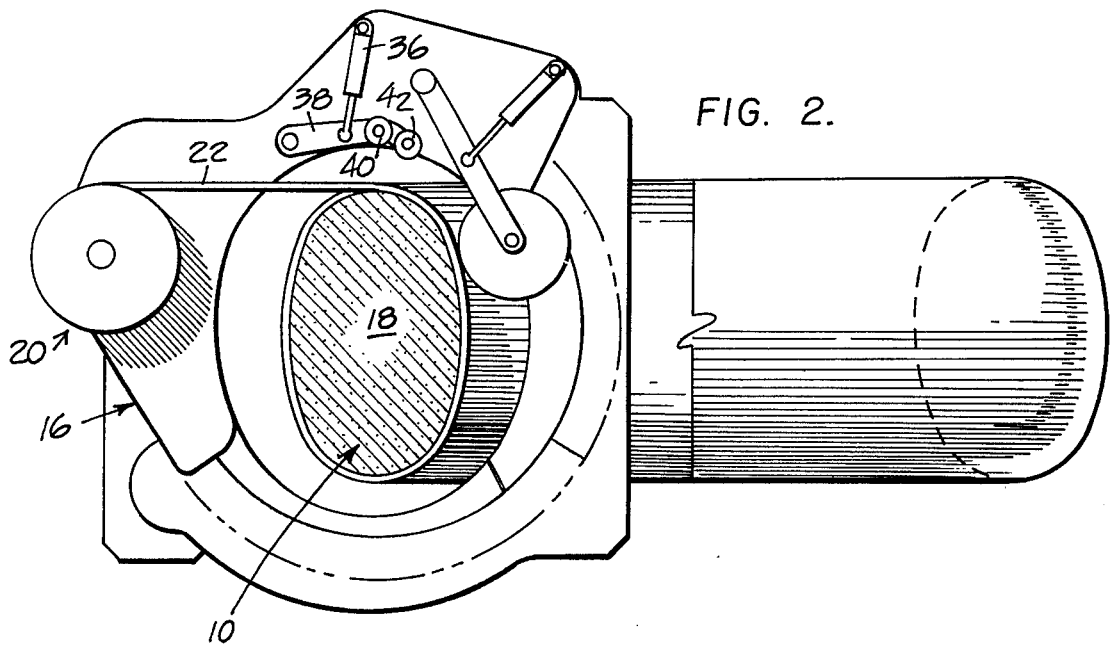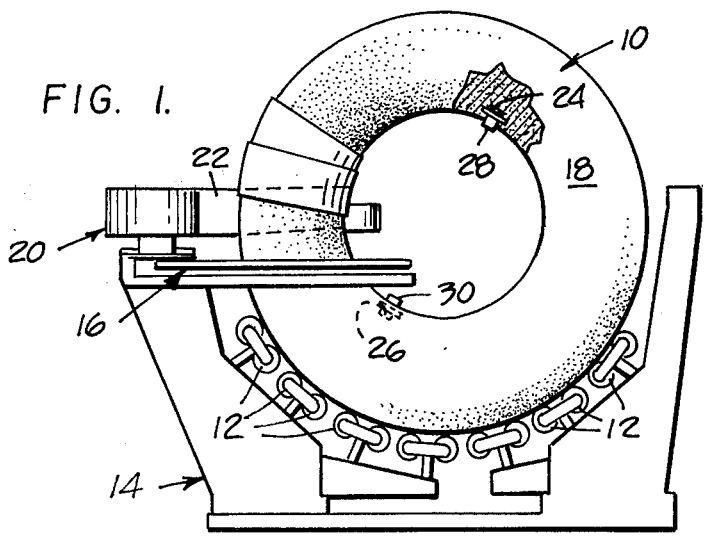

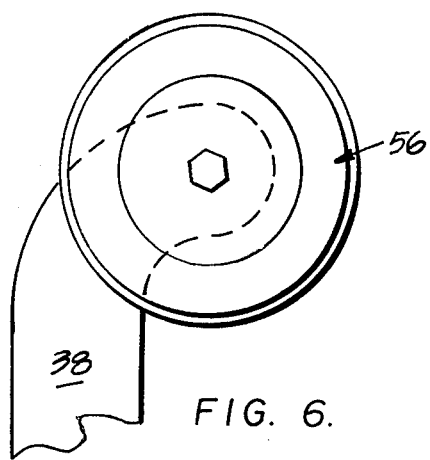
FIG. 6.
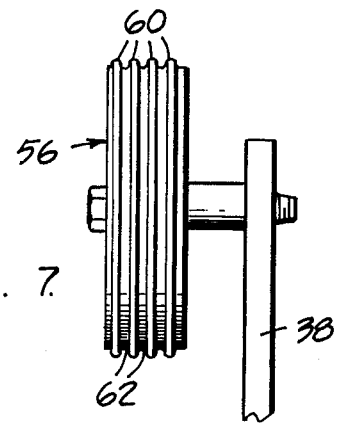
FIG. 7.
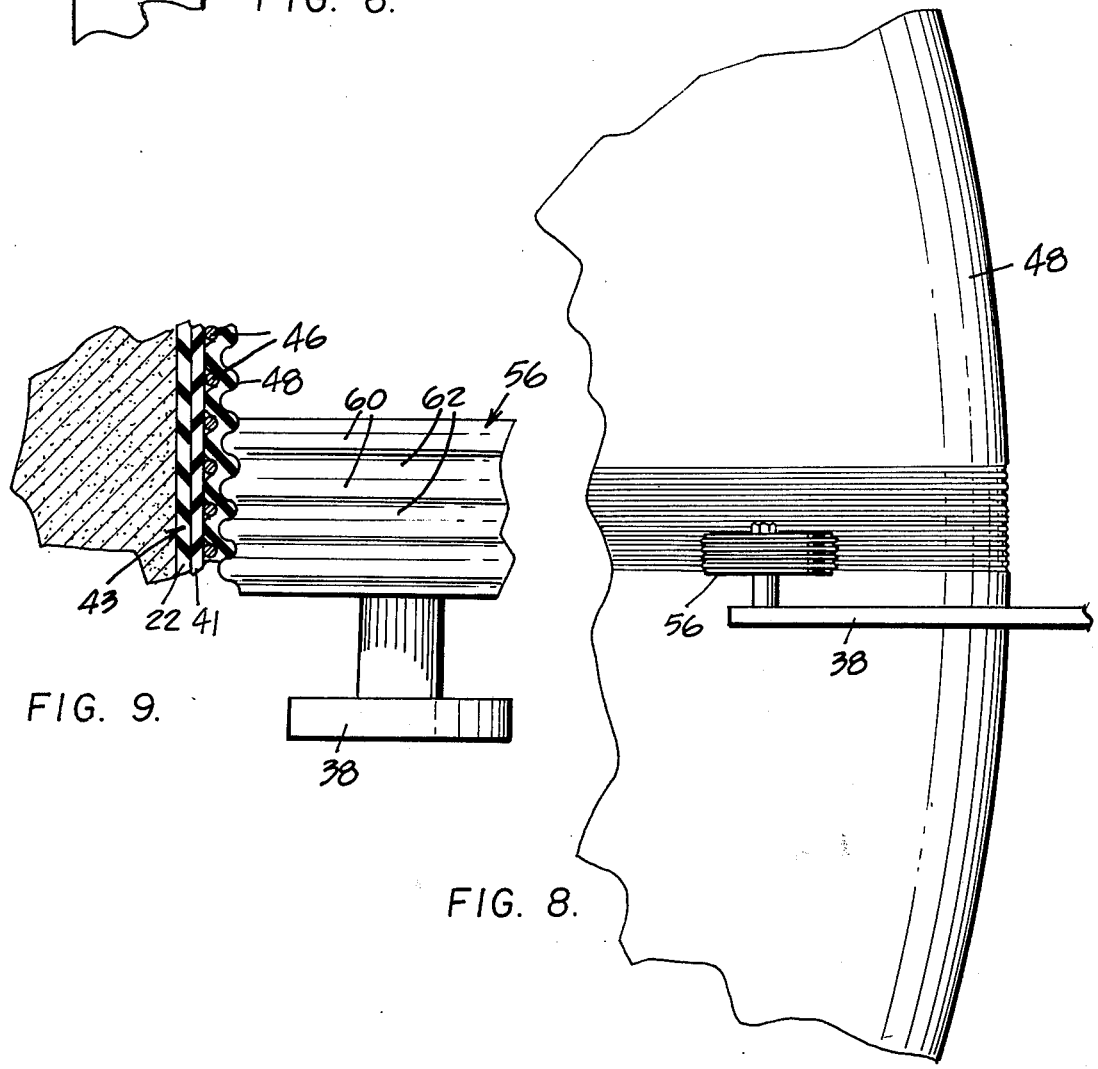
FIG. 9.
FIG. 8.

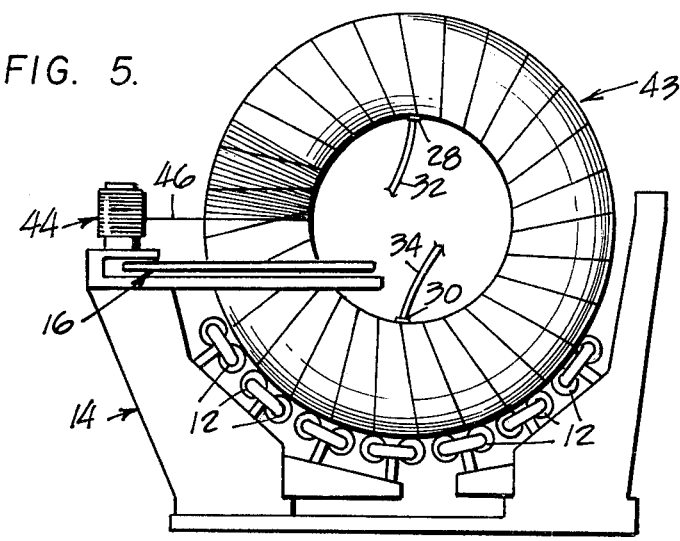
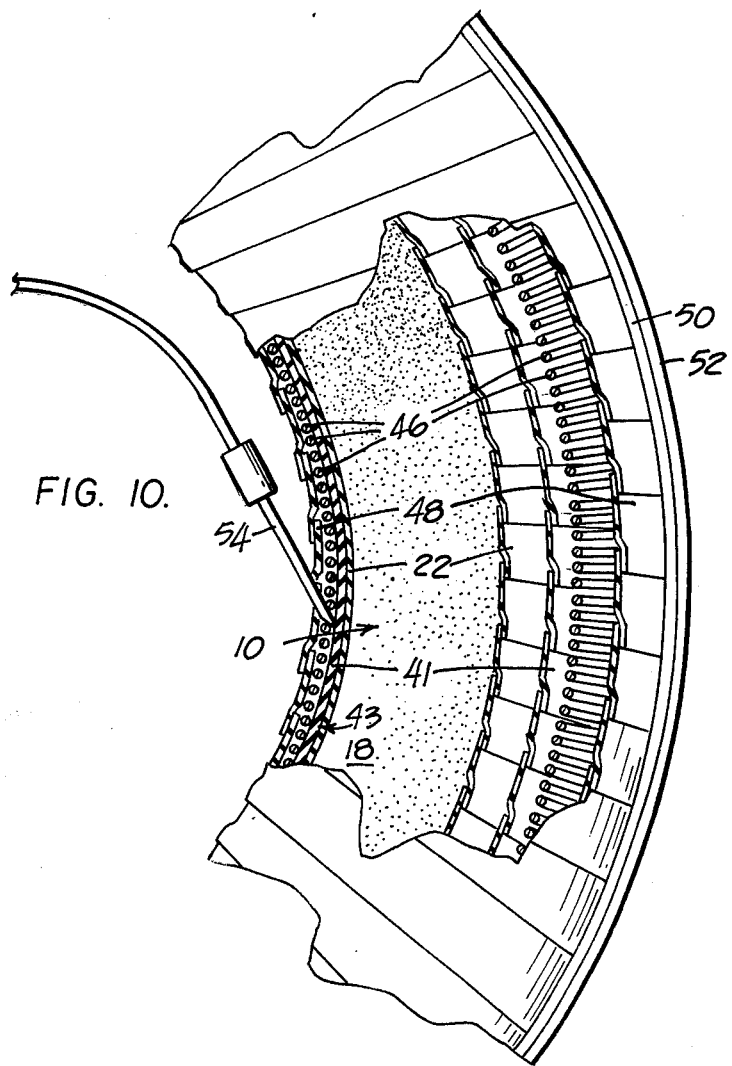

METHOD OF FORMING A TIRE CARCASS

BACKGROUND OF THE INVENTION

This invention relates to a method of forming a tire carcass, and more particularly, to such a method which utilizes winding and wrapping of elements about a core member.

U.S. Pat. No. 3,606,921 issued to Grawey (assigned to the assignee of this invention) discloses a novel oval pneumatic tube-tire. Such tire is generally constructed by forming an oval toroidal tube member of elastomer material on a disintegrable core, winding inextensible filament about the toroidal tube member, and applying further layers of material to form the final tube-tire as illustrated therein. The core is then disintegrated and removed from within the tube-tire.

Generally, in the manufacture of conventional type tires described in that patent, a relatively large amount of hand labor is used. In the fabrication of such conventional tires, the tire is built on a cylindrical drum of laboriously wrapping plies of liner, rubberized reinforcing fabrics, cords or filaments to form a flat endless belt on the surface of the drum. It will be understood that improper application of such layers can lead to defects in the finalized tire, and also to a lack of uniformity between tires. Thus, there is considerable need for improvement in uniformity of tires, as well as need to improve reliability in the final tire product, both of which suggests the need for automatic processes of tire manufacture.

U.S. application Ser. No. 351,779, now U.S. Pat. No. 3,864,183 (assigned to the assignee of this invention), discloses a wrapping machine capable of helically wrapping elastomer material and wire about a toroidal core member. In the use of such machine, it will be understood that it is extremely desirable to arrive at a highly efficient and simple wrapping operation resulting in the formation of tire carcasses which overcome the above-cited problems.

Of general interest in this area are U.S. Pat. No. 3,245,853 to Reinhart, U.S. Pat. No. 1,213,600 to Dunkerley, U.S. Pat. No. 1,248,871 to Kremer, U.S. Pat. No. 3,458,146 to Warner, U.S. Pat. No. 3,351,302 to Lang, and U.S. Pat. No. 3,375,150 to Alexeff.

SUMMARY OF THE INVENTION

It is an object of this invention to provide a method for forming a tire carcass which utilizes means for helically wrapping and winding elements about a toroidal member.

It is a further object of this invention to provide a method which, while fulfilling the above object, results in production of tire carcasses of a high degree of uniformity, meanwhile forming each tire carcass so as to be efficient for the use intended.

It is a still further object of this invention to provide a method which, while fulfilling the above objects, is extremely simple and effective in practice.

Broadly stated, the method of forming a tire carcass comprises the steps of providing a toroidal member, helically wrapping elongated resilient material about and along substantially the entire body of the toroidal member, applying a vacuum to the inner surface of the heically wrapped resilient material in contact with the toroidal member, and applying force to a substantial part of the outer surface of the helically wrapped resilient material to urge it against the toroidal member.

BRIEF DESCRIPTION OF THE DRAWINGS

These and other objects of the invention will become apparent from a study of the following specification and drawings, in which:

FIG. 1 is a side elevation of apparatus for practicing the method disclosed herein, and showing such apparatus in use as wrapping elongated resilient material about a toroidal core;

FIG. 2 is a plan view of a portion of the apparatus of FIG. 1, in combination with a toroidal core which is partially shown in section;

FIG. 3 is a plan view of a portion of FIG. 2, showing a first embodiment of stitching mechanism utilized therein;

FIG. 4 is a side elevation of the stitching mechanism of FIG. 3;

FIG. 5 is a view similar to FIG. 1, but showing the apparatus in use winding wire helically about the toroidal core;

FIG. 6 is a plan view of a second embodiment of stitching mechanism;

FIG. 7 is a side elevation of the stitching mechanism of FIG. 6;

FIG. 8 is a side elevation of the second embodiment of stitching mechanism, showing its use;

FIG. 9 is a side elevation partially in section, and showing in detail the use of the stitching mechanism of FIGS. 6, 7 and 8; and FIG. 10 is a side elevation of the partially formed tire carcass, formed on the core, with portions broken away, and showing the use of a vacuum probe in combination therewith.

DESCRIPTION OF THE PREFERRED EMBODIMENT

The method is performed by apparatus shown in FIGS. 1–10, which with advantage may take the form shown in U.S. application Ser. No. 351,779, now U.S. Pat. No. 3,864,183 assigned to the assignee of this invention, and reference is made to that patent for a detailed description of the operation performed by such apparatus.

In the use of such apparatus, a toroidal core member 10 in the form of a porous sand core is rollably positioned on and supported by a plurality of rollers 12 associated with an apparatus base 14. Generally circular guide means 16 are disposed about the body 18 of the toroidal core 10. The guide means 16 are rotatably supported relative to the base 14 so as to be rotatable about the body 18 of the toroidal core 10, and includes a removable portion to allow positioning of the body 18 of the toroidal core 10 within the circular guide means 16. A spool 20 of elongated elastomer material 22 such as rubber tube material is positioned on the guide means 16, and the guide means are rotated about the body 18 of the toroidal core 10, with the toroidal core 10 meanwhile being rotated about its axis on rollers 12. Upon initial positioning of an end of the rubber material 22 on the body 18 of the core 10, the guide means 16 and core 10 are rotated so that rubber material 22 is helically wrapped about and along the body 18 of the core 10 (FIG. 1). The inner periphery of the core 10 is provided with a pair of depressions 24,26 in which valve fittings 28,30 are positioned, and substantially the entire body 18 of the core 10 is helically wrapped with rubber material 22, allowance being made for the valve fittings 28,30, so that the operation may be stopped when a valve fitting is being approached, and the rubber material 22 may be fitted and positioned by hand, discontinued and recontinued if necessary. The layers of rubber material 22 are in lapping relation as shown.

Well known vacuum applying means (not shown) are connected by hoses 32,34 to the valve fittings 28,30 to apply a vacuum through the porous core 10 to the inner surface of the helically wrapped material 22 in contact with the core 10. Such step aids in properly shaping the inner surface of the resulting tire carcass.

During the continued holding of this vacuum, cylinder 36, mounted on guide means 16, is extended to pivot arm 38, pivotally mounted on guide means 16, to in turn bring knurled stitching rollers 40,42 of FIGS. 3 and 4 mounted on arm 38 into rolling contact with the rubber material 22 applied to the core 10. The guide means 16 are rotated or revolved about the body 18 as the toroidal core 10 itself is rotated, all described above. During such action, the stitching rollers 40,42 follow a helical path about the body 18, applying force to the other surface of the wrapped material 22 to roll or stitch the overlapped edges together and to urge the material 22 against the toroidal core 10.

During the holding of such vacuum, the cylinder 36 is retracted, pivoting arm 38 away from the core 10, and the apparatus is set up again as shown in FIG. 1, with the spool 20 of rubber material 22 being replaced by a spool of rubber bond material 41 (shown applied in FIGS. 9 and 10). The apparatus is again operating in the above described manner, to helically wrap rubber material 41 in the same manner as previously described. The rubber material 22 and rubber material 41 together form the rubber material 43 which is closest to the core 10, and it will be understood that the broad use of the term "rubber material 43" is to be interpreted as meaning as many wraps as necessary (i.e., one or more) to form a foundation on which the wire utilized in the next method step is to be wound. It is also to be understood that the stitching described above could take place after the entire rubber material 43 is positioned on the core 10 (including material 22 and material 41).

During continued holding of such vacuum, the apparatus is set up as shown in FIG. 5, with the spool of rubber 41 being replaced by a spool 44 of elongated, flexible, substantially inextensible material 46 such as wire. The apparatus is operated in accordance with the above description, to helically wind the wire 46 about and along substantially the entire body 18 of the toroidal core of the outer surface of the rubber material 43, allowing for the valve fittings 28,30 as above.

After the winding of such wire 46, and before the next step in the process, the vacuum applied above is released. Rubber bond stock is applied to the areas of the valve fittings 28,30 where necessary. Pressure is applied through the valve fittings 28,30 to the core 10 to check for leaks in the area of such valve fittings 28,30.

Upon release of such pressure, the apparatus is again set up as in FIG. 1, to helically wrap additional elongated rubber bond material 48 about and along substantially the entire body 18 of the core 10 over the outer surface of the rubber material 43 and the wire 46. After such step, circumferential rubber wraps 50,52 are applied about the outer periphery of the thus far formed carcass.

A hollow vacuum probe 54 connected to vacuum means is then entered through the additional material 48 into the area of the wire 46, between such material 43 and additional material 48. The stitching rollers 40,42 of FIGS. 3 and 4 are replaced by the stitching roller 56 of FIGS. 6, 7 and 8, and the toroidal core 10 is rotated, as are the guide means 16, as previously described. The stitching roller 56 is provided with projections 60 defining grooves 62 therebetween, and the stitching roller 56 is helically rotated about the body 18 of the toroidal core 10 to apply force to a substantial portion of the additional rubber material 48 to urge it against the wire 46 and the first-applied rubber material 43. It will be seen that the projections 60 squeeze rubber of the additional material 48 down between adjacent turns of wire 46 to eliminate air pockets, and the grooved portions 62 press rubber of the additional material 48 down against the wire turns. The vacuum probe 54 operates continuously during such stitching, and aids in eliminating air pockets between the rubber material 43 and rubber material 48. The vacuum probe 54 may be moved periodically to adjacent the stitching operation to provide optimum operation.

Upon completion of such stitching operation, the vacuum probe 54 is removed, and the resulting structure is removed from the apparatus to a holding station. Upon arrival of such structure at the holding station, a vacuum is applied to the core 10 through the valve fittings 28,30 for a length of time, for testing purposes.

Through such process, a tire carcass is formed on the core 10.

What is claimed is:

1. A method of forming a tire carcass comprising the steps of: providing a toroidal member; helically wrapping elongated resilient material about and along substantially the entire body of the toroidal member; applying a vacuum to the inner surface of the helically wrapped resilient material in contact with the toroidal member; applying force to a substantial part of the outer surface of the helically wrapped resilient material to urge it against the toroidal member; helically winding elongated flexible substantially inextensible material about and along substantially the entire body of the toroidal member, over the outer surface of the helically wrapped resilient material; helically wrapping additional elongated resilient material about and along substantially the entire body of the toroidal member over the outer surface of the first-mentioned helically wrapped resilient material and the elongated flexible substantially inextensible material; and applying a vacuum in the area of the helically wound elongated flexible substantially inextensible material between the first-mentioned helically wrapped resilient material and the additional helically wrapped resilient material.

2. The method of claim 1 and further comprising the step of applying force to a substantial portion of the additional helically wrapped resilient material to urge it against the elongated flexible substantially inextensible material and against the first-mentioned helically wrapped resilient material.

3. The method of claim 2 wherein the vacuum applied to the inner surface of the first-mentioned helically wrapped resilient material is held during the step of applying force to the substantial part of the outer surface of the firstmentioned helically wrapped resilient material, and wherein said vacuum applied to the inner surface of the first-mentioned helically wrapped resilient material is released after the step of helically winding elongated flexible substantially inextensible material, and before the step of helically wrapping additional elongated resilient material.

4. A method of forming a tire carcass comprising providing a toroidal member;
helically wrapping elongated resilient material about and along substantially the entire body of the toroidal member;
helically winding elongated flexible substantially inextensible material about and along substantially the entire body of the toroidal member over the outer surface of the helically wrapped resilient material;
helically wrapping additional elongated resilient material about and along substantially the entire body of the toroidal member over the outer surface of the first-mentioned helically wrapped resilient material and the elongated flexible substantially inextensible material; and
applying a vacuum in the area of the helically wound elongated flexible substantially inextensible material between the first-mentioned helically wrapped resilient material and the additional helically wrapped resilient material.

5. The method of claim 4 and further comprising the step of applying force to a substantial portion of the additional helically wrapped resilient material to urge it against the elongated flexible substantially inextensible material and against the first-mentioned helically wrapped resilient material.

6. The method of claim 5 wherein the vacuum applied in the area of the helically wound flexible substantially inextensible material is held during the step of applying force to the substantial portion of the additional helically wrapped resilient material.

7. A method of forming a tire carcass comprising the steps of: providing a toroidal member; helically wrapping elongated resilient material about and along substantially the entire body of the toroidal member; applying a vacuum to the inner surface of the helically wrapped resilient material in contact with the toroidal member; and applying force to a substantial part of the outer surface of the helically wrapped resilient material to urge it against the toroidal member; wherein the step of providing a toroidal member comprises the step of providing a porous toroidal member, and wherein the step of applying the vacuum to the inner surface of the helically wrapped resilient material comprises applying said vacuum through at least a portion of said porous toroidal member.

* * * * *